T. ONO.
CRUST BREAKING ATTACHMENT FOR CULTIVATORS.
APPLICATION FILED AUG. 19, 1918.
1,310,924. Patented July 22, 1919.
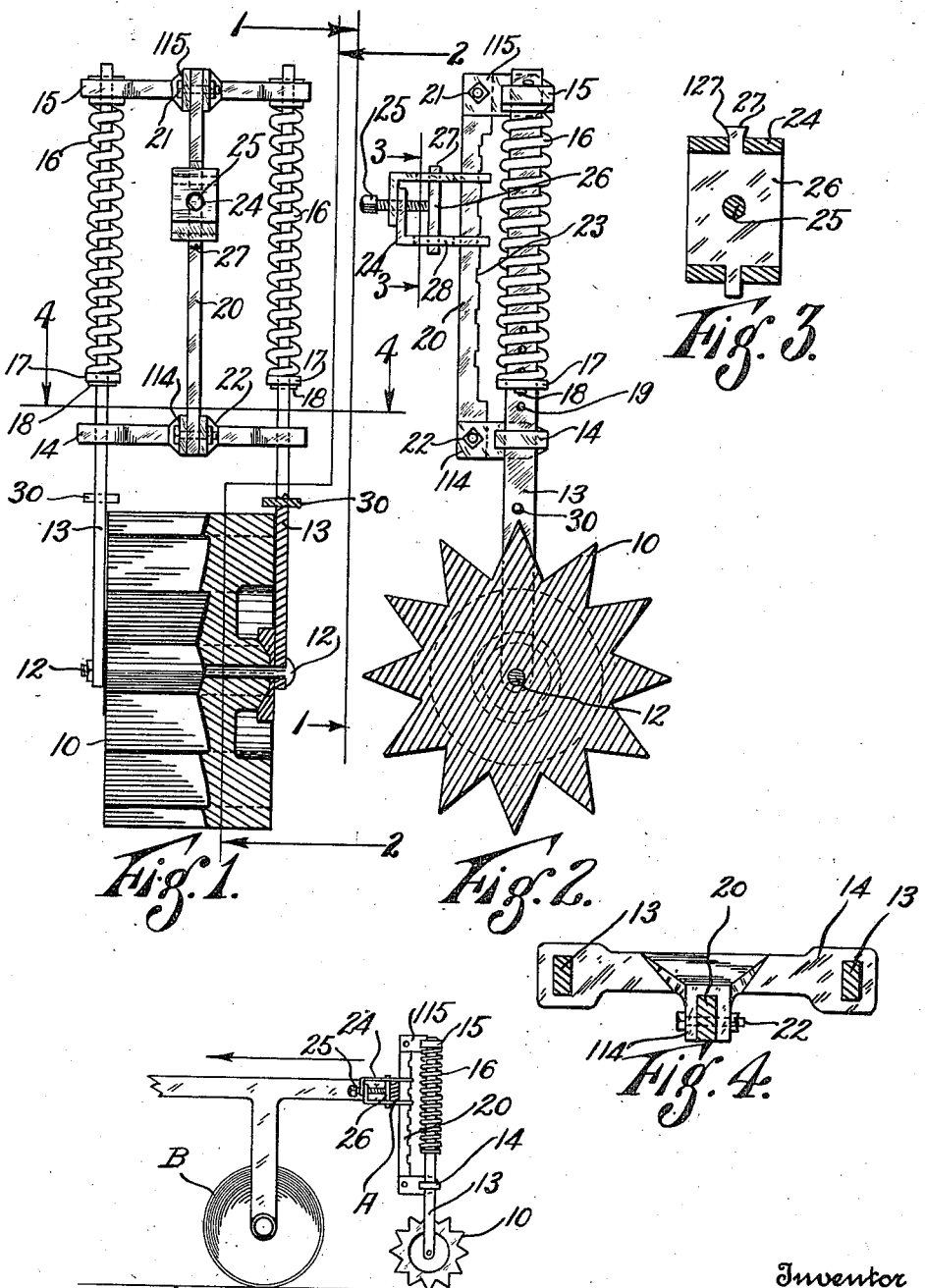
Inventor
Takano Ono

UNITED STATES PATENT OFFICE.

TAKANO ONO, OF SEDGWICK, COLORADO.

CRUST-BREAKING ATTACHMENT FOR CULTIVATORS.

1,310,924.     Specification of Letters Patent.     Patented July 22, 1919.

Application filed August 19, 1918. Serial No. 250,469.

*To all whom it may concern:*

Be it known that I, TAKANO ONO, a citizen of Japan, residing at Sedgwick, county of Sedgwick, and State of Colorado, have invented certain new and useful Improvements in Crust-Breaking Attachments for Cultivators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a device to be run over rows of sprouting seeds to break the crust that has formed thereon and the object thereof is to assist the young plants in coming through the soil. It is devised primarily for use in beet fields but obviously may be used with other crops.

Briefly the invention comprises a roller having radially projecting portions to break the crust, the roller being mounted in vertically reciprocable members connected with the frame work of a cultivator.

In the drawings:

Figure 1 is a front elevation of the device taken generally on line 1—1, Fig. 2, but with a portion of the roller in vertical section.

Fig. 2 is taken on the line 2—2 of Fig. 1 showing the frame work in side elevation and the roller in vertical section.

Fig. 3 is a detail on line 3—3 of Fig. 2.

Fig. 4 is a horizontal section on line 4—4 of Fig. 1.

Fig. 5 is a side elevation indicating the location of the device on a cultivator ready for use.

The roller or breaker wheel is provided with a series of ribs or projections 10, the roller being mounted on an axle 12 journaled in the upright supporting arms 13. The arms 13 are reciprocable in the ends of the lower cross bar 14 and the upper bar 15, each arm having thereon a spring 16 which engages the upper bar 15 at one end and a small washer 17 at the other end, the washer 17 being held in place by a pin 18 which may be adjusted in the holes 19 to vary the tension of the spring. The bar 15 has laterally projecting centrally located ears 115 and the lower bar 14 has similar ears 114. An upright post 20 has its opposite ends pivotally connected at 21 and 22 with the ears 115 and 114 respectively, the inner face of this post being provided with notches 23. Angle arms 24 are slidably mounted on the post 20 and are retained in adjusted position by engagement with the notches 23. One arm 24 is longer than the other and the outer end thereof overlaps the outer end of the other as shown. A screw bolt 25 passes through these overlapping ends, being threaded into the inner one, and engages a plate 26. The plate 26 is provided with oppositely arranged lugs 27 projecting through slots 28 in the angle arms 24, whereby the plate is laterally adjustable. The outer end of the upper lug 27 is enlarged at 127 so that it will always be retained in the upper arm 24. Each supporting arm 13 is provided with an inwardly projecting abutment 30 immediately above the roller 10 to limit the upward movement of the roller so that the projections will never rise high enough to engage the cross bar 14 or ears 114.

In operation the device is mounted on a cross beam A of a cultivator and in alinement with the space between two disks B of the cultivator. To mount the device the bolt 25 is removed. The upper angle bar 24 is elevated carrying the plate 26 with it. The arms 24 are then passed over the cross beam A, one on each side thereof, the arms brought together with the plate 26 on the outer side of the beam, the lower lug 27 being positioned in the corresponding slot 28, the inner ends of the arms engaged in the proper notches 23, and the bolt 25 placed in position and screwed home against the plate 26 until the device is rigidly held on the cross beams A. The adjustment of the plate 26, the notches 23 and the fact that the arms 24 are far enough apart to accommodate the maximum width of beam, enable the device to be mounted on any cultivator. The disks B will cultivate along the sides of the row while the roller 10 rolls along the top of the row and breaks the crust. If the roller strikes a rock or other hard object it will rise against the tension of the spring 16. But the abutments 30 will prevent it from rising sufficiently to engage the bar 14 or ears 114.

It will be seen from the above description that the device may be readily applied to any make of cultivator when the young plants are coming up or are about to come up, and that it will efficiently break the crust in the row, while the disks cultivate at the sides of the row.

I claim:

1. A crust breaker comprising a framework adapted to be connected to a cultivator and having upper and lower cross bars, vertically disposed arms reciprocable in the cross bars, springs on said arms and engaging the framework, a roller having crust-breaking projections journaled in the lower ends of said arms, and means on said arms above said roller adapted to limit the reciprocation of the roller to prevent engagement thereof with the lower cross bar.

2. A crust breaker comprising a framework having upper and lower cross bars, a post connected with said bars, means to connect the post with a cultivator beam, vertically reciprocable arms in the ends of said cross bars, and a crust-breaking roller journaled in the lower ends of said arms.

3. A crust-breaking attachment comprising a framework, a roller, a mounting for said roller reciprocable in said framework, said framework having a post, oppositely disposed slotted arms slidable on said post, a plate between said arms having projections movable in the slots in said arms, and means in the ends of said arms adapted to engage said plate to clamp a cultivator beam between the plate and the post.

In testimony whereof I affix my signature.

TAKANO ONO.

Copies of this patent may be obtained for five cents each, by addressing the "Commissioner of Patents, Washington, D. C."